United States Patent [19]

Guess

[11] 4,110,561
[45] Aug. 29, 1978

[54] COMMUNICATION UNIT FOR CODE GENERATION AND VOICE COMMUNICATION

[75] Inventor: Joe F. Guess, Cedar Rapids, Iowa

[73] Assignee: Conrac Corporation, Stamford, Conn.

[21] Appl. No.: 817,266

[22] Filed: Jul. 20, 1977

[51] Int. Cl.² ............................................. H04M 1/50
[52] U.S. Cl. ............................. 179/2 EA; 179/84 VF; 331/116 M
[58] Field of Search ............... 179/2 E, 2 EA, 84 VF; 331/116 M, 156; 325/16

[56] References Cited

U.S. PATENT DOCUMENTS

| | | | |
|---|---|---|---|
| 3,713,045 | 1/1973 | Usuda et al. | 331/116 M |
| 3,939,418 | 2/1976 | Morrison et al. | 325/16 |
| 3,970,801 | 7/1976 | Ross et al. | 179/84 VF |

Primary Examiner—Kathleen H. Claffy
Assistant Examiner—Joseph A. Popek

[57] ABSTRACT

Communication units for hand-held use, combining a microphone for voice communication with means for generating at least two code frequencies for signaling, are made more compact and economical by dual capability of a single amplifying circuit in oscillating mode for tone generation and in substantially linear mode for amplifying the microphone output.

5 Claims, 1 Drawing Figure

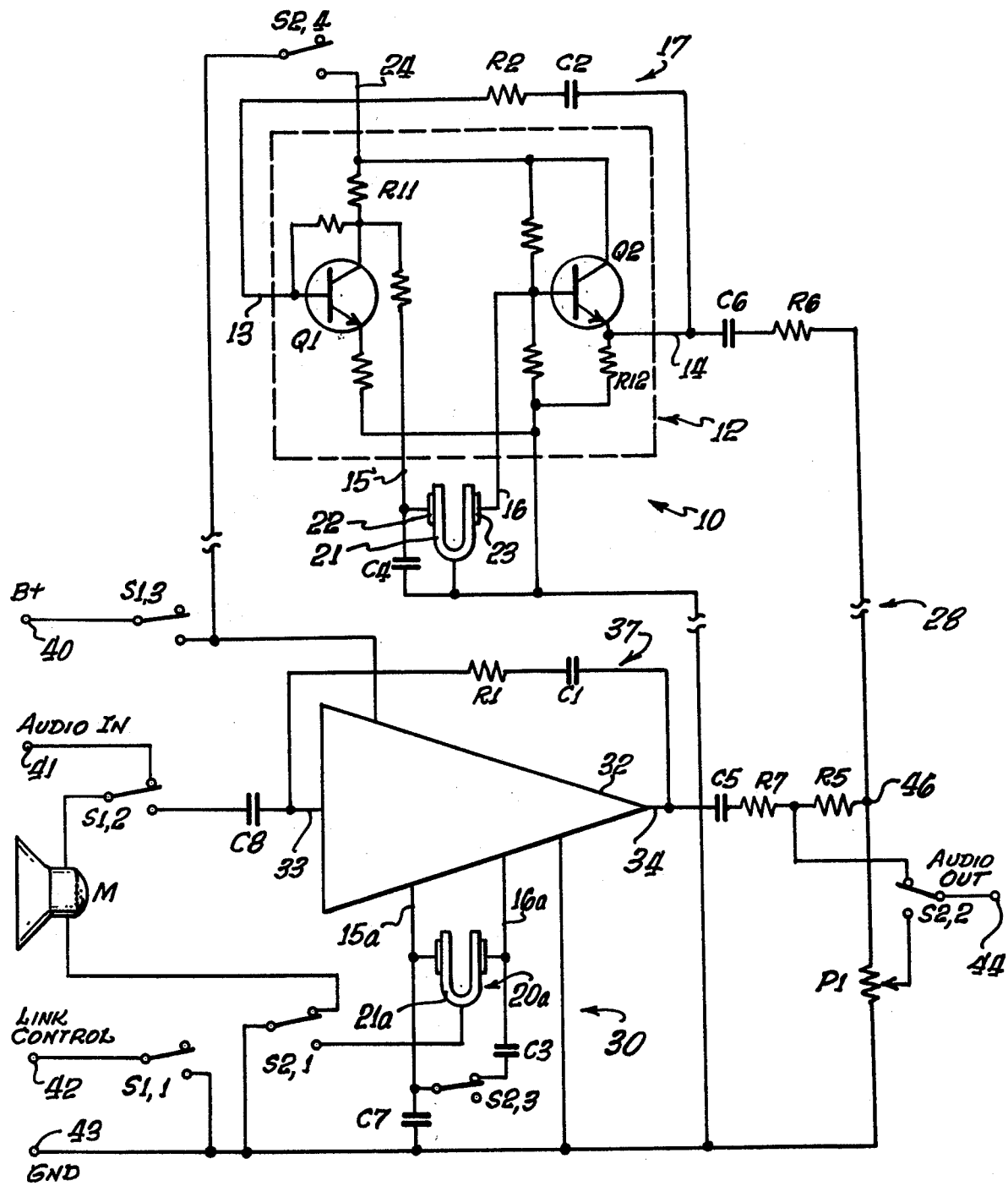

COMMUNICATION UNIT FOR CODE GENERATION AND VOICE COMMUNICATION

BACKGROUND OF THE INVENTION

This invention has to do with circuit arrangments for voice communication, typically from a local station via a radio link or the like to a central station, with provision for generating code tone signals over the same link.

The invention is concerned especially with improving the known type of compact communication unit which may typically be held conveniently in the hand with flexible cable connections to the local station of the radio link. Such a hand-held unit typically includes a small microphone which may normally operate as loud speaker to reproduce incoming audio signals. Operation of a manual switch connects the microphone to an amplifier for outgoing voice transmission. Additionally, a plurality of tone generating circuits having distinctive respective frequencies may be manually actuated to transmit code signals, as to alert the central station.

An important object of the present invention is to permit communication units of the described type to be made more compact and economical. In particular, it is desired to reduce the number of major elements that must be individually mounted on the circuit board of the unit and provided with suitable electrical connections.

The presently available units typically include at least two tone generators with outputs connected in parallel to give a distinctive sound for the code signaling phase of operation. Each tone generator comprises an individual amplifier which is caused to oscillate by positive feedback and is provided with suitable means for stabilizing the frequency of the resulting oscillation. Stabilized oscillators of that general type are available commercially in the form of a two-stage transistor amplifier with the stages coupled by frequency stabilizing means which may comprise a tuned electrical circuit or a mechanical device such as a tuning fork with piezoelectric coupling elements, or the like. For the sake of definiteness the invention will be described primarily as utilizing oscillating amplifiers each formed as an integrated circuit and with frequency stabilization by an external tuning fork coupled to the respective amplifier stages by piezoelectric transducers cemented to the two tines of the fork. With that illustrative arrangement, an integrated circuit and a tuning fork must be provided for each individual tone that is to be generated. Since purchasers usually specify capability for generating a definite number of tones, there is then little or no flexibility in the number of major elements required for the tone generating portion of the equipment.

Communication units of the described type are commonly controlled manually by two distinct switched of push-button type, with the control buttons well separated from each other on the unit to facilitate their separate operation. One switch is operated to enable voice transmission over the radio link. The tone code generating phase is enabled by operating the other switch, or by operating both switches together. With neither switch operated the unit is in idle condition, and the microphone is then typically connected between ground and an audio input terminal so that it can act as loudspeaker to reproduce any incoming communication from the radio link. The described control format requires at least two switches, each of which must have several distinct electrical poles to handle such functions as switching on the radio link if it is normally idle, energizing the microphone amplifier for voice transmission and the tone generating amplifiers for tone production, switching the microphone between its amplifier and the audio input line, and supplying the radio link with the proper output signals for the respective modes of operation. Thus, it is difficult or impossible to reduce significantly the space requirements for the switching facility.

SUMMARY OF THE INVENTION

The present invention provides appreciable saving of parts cost and of space on the circuit board of such instruments by dual use of one of the oscillator amplifiers both for tone generation during operation in signaling mode and for amplifying the microphone output during voice communication operation. Despite the very different performance characteristics required for those modes of operation, it has been found to be feasible to use a single amplifier for both functions without significant increase in the complexity of the switching system. By providing such dual amplifier utilization, the invention permits elimination from the system of an entire amplifier and its electrical connections.

BRIEF DESCRIPTION OF THE DRAWING

A full understanding of the invention, and of its further objects and advantages, will be had from the following description of an illustrative embodiment. The accompanying drawing, which is a part of that description, is a schematic diagram representing an illustrative form of the invention.

DESCRIPTION OF PREFERRED EMBODIMENT

In the drawing, two typical tone generating circuits are represented at 10 and at 30, respectively. Additional tone generators in any desired number may be provided, as indicated by the broken lines at 28.

Referring first to tone generator 10, a typical two-stage amplifier is represented at 12, with the input 13, the output 14 and the positive feedback circuit 17 including the resistance R2 and the capacitance C2 in series. The amplifier is selectively energized by applying power via the line 24 under control of the switch designated S2,4. The first amplifier stage comprises the transistor Q1, which is connected as a common-emitter inverting amplifier with voltage gain. Its output signal is taken across the collector resistance R11 and is supplied to the line 15. The second stage transistor Q2 receives its input signal from the line 16 and is connected as a non-inverting emitter follower with the emitter resistance R12.

The two stages are coupled with respect to alternating current signals via the conventional tuning fork stabilizer 20, which comprises the grounded fork proper 21 and the two piezoelectric transducer elements 22 and 23. Those elements are cemented to the respective tines of the fork, with one terminal contacting the fork and the other insulated from it by the dielectric crystal and at a potential which varies with flexure of the tines. Line 15 is connected to transducer 22, driving the fork in response to the output of the amplifier first stage. Transducer 23 responds to the resulting fork movement, producing on the line 16 an input signal for the amplifier second stage, which performs impedance matching between the tuning fork element and output line 14. Capacitor C4 improves the tuning.

The phase relations of the amplifier, its feedback circuit and the coupling action through tuning fork 20 are so arranged as to provide strong positive overall feedback. In the present circuit the tuning fork stabilizer is so arranged that a positive signal on one piezoelectric element produces a negative signal on the other. The resulting two inversions, one in the first amplifier stage and the other in the tuning fork stabilizer, then give overall positive feedback around the loop. That positive feedback with gain greater than unity causes the amplifier to operate in regenerative mode, producing oscillations at the natural frequency of the tuning fork.

The second tone generator 30 of the figure typically comprises the amplifier 32, which is shown only in block form and which is typically substantially identical with amplifier 12 of tone generator 10, just described. Generator 30 also includes the stabilizing tuning fork assembly 20a, which is typically substantially identical to fork assembly 20 except that the fork has a different natural frequency. When in its regenerative tone generating mode, generator 30 operates as already described for generator 10, producing on the output line 34 a tone signal having a frequency determined by tuning fork 20a.

In accordance with the present invention, one of the tone generators of the FIGURE, shown as generator 30, operates selectively as a tone generator, and has also the capability, in response to suitable control, to operate in the entirely different mode of providing a stable and substantially linear amplifier for processing signals received from the microphone M.

As illustratively shown, the system of the FIGURE includes two distinct switch banks S1 and S2, which are separately operable in response to any desired control means. The switch banks typically comprise respective multipole push-button switches, which are normally in the idle positions shown in the drawing, and are individually operable manually to shift all their poles or component switches simultaneously to the opposite positions. The individual component switches of each bank are designated by numerals following the designation S1 or S2.

The drawing assumes connection of the illustrated communication unit via a five-conductor flexible cable, not explicitly shown, to a local station, which may be connected to a central station via a radio link or the like. The cable includes a ground conductor connected to the terminal 43, a positive direct current power conductor connected to the terminal 40, and other conductors to be described. With both switch banks S1 and S2 in idle position, as shown in the drawing, tone generators 10 and 30 are both disabled by open position of switches S1,3 and S2,4. The open switch S1,1 lifts the ground from the terminal 42, typically acting through a control conductor to switch the radio link or its equivalent to receiving mode. The audio input terminal 41 then receives audio information supplied from the radio link via an audio cable conductor, and passes it via the idle switch S1,2 to the microphone M. With the other microphone terminal grounded via the switch S2,1, the microphone acts as a loudspeaker to reproduce such input audio.

Upon operation of switch bank S1, control terminal 42 is grounded via switch S1,1, typically shifting the radio link to sending mode. Closure of the switch S1,3 supplies power to amplifier 32 of tone generator 30. However, the normal tone generating mode of that generator is disabled by idle condition of switch bank S2, which lifts the ground from tuning fork 21a at switch S2,1 and connects the capacitance C7 via switch S2,3 between lines 15a and 16a, thereby bypassing the entire tuning fork assembly 20a for alternating current signals. The latter action effectively couples the two stages of amplifier 32 via capacitance C7. Since that coupling is non-inverting in its action, the overall feedback action via circuit 37 becomes negative, converting the amplifier to stable operating mode at a controlled gain. Operated position of switch S1,2 connects microphone M via the coupling capacitance C8 between ground and input line 33 of amplifier 32, rendering the amplifier responsive to any output signals from the microphone. Capacitance C8 is preferably selected to provide with the impedance of the microphone a time constant approximately equal to that of feedback circuit 37, producing essentially linear frequency response. The amplifier output on line 34 is coupled via the capacitance C5, the resistance R7 and the idle switch S2,2 to the output terminal 44 and thence to the output line of the cable. Thus, operation of S1 readies the system for voice transmission.

On the other hand, when switch banks S1 and S2 are both operated, the system is shifted to code generating mode. Operation of switch S2,1 isolates microphone M and grounds tuning fork 21a. Operation of S2,3 opens the shunt connection through C7 across the tuning fork assembly, restoring amplifier 32 to oscillating mode and producing its characteristic tone signal on output line 34. Operation of switch S2,4 supplies power to tone generator 10, which acts as already described to produce its characteristic tone on output line 14. The two tone signals are coupled via the respective capacitances and summing resistances C5, R5 and C6, R6 and are combined at the junction 46. Resistance R7 is typically small compared to R5, and can be either neglected or taken into account in selection of R5, as desired. The combined tone signal at junction 46 is preferably adjustably attenuated by the potentiometer P1 to equalize the tone code and voice signal levels, and is then supplied via the operated switch S2,2 to output terminal 44 and the radio link or its equivalent.

In normal operation of the described communication unit, audio information from the central station can be monitored via the microphone-speaker in idle condition of the system. If it is desired to transmit to the central station, both switch banks S1 and S2 are typically operated, transmitting the tone code characteristic of the two tone generators. Release of both switch banks then makes any response from the central office audible via the microphone. Finally, operation of S1 alone then provides for voice transmission.

I claim:
1. In a tone code generating and voice communication unit, the combination of
   a microphone,
   a plurality of tone generating means, each comprising an amplifier, resonant means, and coupling means for coupling the amplifier in regenerative mode to the resonant means to produce oscillations of stable frequency,
   output terminal means,
   manual switching means having first and second operating positions,
   and circuit means coupled to the switching means for enabling the tone generating means and coupling the same to the output terminal means in response to one operating position of the switching means,
   said circuit means being responsive to the other operating position of the switching means for convert- ing one of said amplifiers to stable operating mode and coupling the converted amplifier between the microphone and the output terminal means.

2. Combination according to claim 1, including an audio input terminal, said switching means having also an idle position, and said circuit means including means responsive to idle position of the switching means for operatively connecting the audio terminal to the microphone to reproduce audio signals supplied via the audio terminal.

3. In a tone code generating and voice communication unit, the combination of a microphone, output terminal means, a plurality of tone generating means, each comprising an amplifier including two successive stages, feedback means coupling the second stage output to the first stage input, and tuning fork stabilizing means normally coupling the first stage output to the second stage input with signal inversion for enabling the amplifier in regenerative mode to produce oscillations of stable frequency, manual switching means having first and second operating switching positions, and circuit means coupled to the switching means for enabling said tone generating means and coupling the same to the output terminal means in response to one operating position of the switching means, said circuit means being responsive to the other operating position of the switching means for disabling said stabilizing means of one of said tone generating means and for coupling the amplifier of said one tone generating means between the microphone and the output terminal means with its first stage output coupled to the second stage input without signal inversion for enabling the amplifier for operation with stable gain.

4. Combination according to claim 3, including an audio input terminal, said switching means having also an idle position, and said circuit means including means responsive to idle position of the switching means for operatively connecting the audio terminal to the microphone to reproduce audio signals supplied via the audio terminal.

5. Combination according to claim 3 wherein said switching means comprise first and second multipole switches having respective normal idle positions and being manually shiftable independently to respective operated positions, said first operating switching position comprising operated position of both said first and second switches, and said second operating switching position comprising operated position of said first switch and idle position of said second switch.

* * * * *